(12) United States Patent
Ryutaki

(10) Patent No.: US 9,798,350 B2
(45) Date of Patent: Oct. 24, 2017

(54) OPERATION PEDAL FOR VEHICLE

(71) Applicant: TOYODA IRON WORKS CO., LTD., Toyota-shi, Aichi (JP)

(72) Inventor: Kozo Ryutaki, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 0 days.

(21) Appl. No.: 14/914,169

(22) PCT Filed: Mar. 6, 2014

(86) PCT No.: PCT/JP2014/055789
§ 371 (c)(1),
(2) Date: Feb. 24, 2016

(87) PCT Pub. No.: WO2015/040874
PCT Pub. Date: Mar. 26, 2015

(65) Prior Publication Data
US 2016/0216725 A1 Jul. 28, 2016

(30) Foreign Application Priority Data

Sep. 19, 2013 (JP) .................. 2013-194036

(51) Int. Cl.
G05G 1/48 (2008.04)
G05G 1/483 (2008.04)
B60T 7/04 (2006.01)

(52) U.S. Cl.
CPC ............... *G05G 1/483* (2013.01); *B60T 7/04* (2013.01)

(58) Field of Classification Search
CPC .. G05G 1/483; G05G 1/48; B60T 7/06; B60T 7/04
See application file for complete search history.

(56) References Cited

U.S. PATENT DOCUMENTS 2,521,606 A * 9/1950 Rodd .................. G05G 1/405
74/513
7,152,500 B2 * 12/2006 Kanbe .................. B60T 7/045
74/560
(Continued)

FOREIGN PATENT DOCUMENTS

JP S56152324 U 11/1981
JP 2004175240 A 6/2004
(Continued)

OTHER PUBLICATIONS

Jun. 10, 2014 International Search Report issued in International Patent Application No. PCT/JP2014/055789.

*Primary Examiner* — Thomas C Diaz
(74) *Attorney, Agent, or Firm* — Oliff PLC

(57) ABSTRACT

In first and second flat plates and provided in the pad mounting portion, projecting portions for locking the pedal pad are provided at positions not juxtaposed with each other in any one of first to third directions. On the other hand, the pedal pad is mounted on the pad mounting portion with an inner wall of a through hole locked by the projecting portion, and with an inner wall of a through hole locked by the projecting portion. In a mounting work, a worker inserts the pad mounting portion through an opening portion of the pedal pad and makes the pedal pad slide toward the second direction so as to complete the mounting. As a result, an operation pedal for a vehicle capable of improving assembling performances of a pedal pad to a pad mounting portion is provided.

5 Claims, 7 Drawing Sheets

(56) References Cited

U.S. PATENT DOCUMENTS

| | | | |
|---|---|---|---|
| 8,656,805 B2* | 2/2014 | Palacio Arguelles | B60T 7/06 74/560 |
| 2004/0144199 A1 | 7/2004 | Kanbe et al. | |

FOREIGN PATENT DOCUMENTS

| | | | |
|---|---|---|---|
| JP | 2007011932 A | 1/2007 |
| JP | 2011215869 A | 10/2011 |
| JP | 2012208784 A | 10/2012 |

* cited by examiner

Third Direction
⊗ → Second Direction
↓
First Direction

OPERATION PEDAL FOR VEHICLE

CROSS-REFERENCE TO RELATED APPLICATIONS

This application is based upon and claims the benefit of priority of the prior Japanese Patent Application No. 2013-194036, filed on Sep. 19, 2013, the entire contents of which are incorporated herein by reference.

TECHNICAL FIELD

A technology disclosed in the present application relates to an operation pedal for a vehicle and particularly to a mounting structure of a pedal pad.

BACKGROUND ART

Operation pedal devices for a vehicle used when a driver operates a vehicle include a parking brake device, a brake pedal device, an accelerator pedal device, a clutch pedal device and the like. This type of operation pedal devices for a vehicle include one provided with a pedal arm rotatably provided on a vehicle body and a pedal pad attached to a pad mounting portion provided at a tip end portion of the pedal arm as an operation pedal operated by the foot of the driver. Moreover, the operation pedal includes one in which the pedal pad made of an elastic member is fitted in the pad mounting portion provided with an engaging portion so that the pedal pad does not remove from the pad mounting portion by a stepping-on operation on the pedal pad by the driver (refer to Japanese Laid-Open Patent Application No. 2012-208784 and No. 2011-215869, for instance), for example. The pad mounting portion disclosed in the aforementioned patent application is formed such that a flat plate-shaped steel plate is bent by pressing and two flat plates are faced with each other, and the foot of the driver is placed on one of the two flat plates. The pad mounting portion has an engaging portion provided on a side surface portion connecting the two flat plates and is mounted by engaging an engaged portion of the pedal pad with this engaging portion.

RELATED ART

Patent Document

Patent Document 1: Japanese Patent Laid-Open No. 2012-208784
Patent Document 2: Japanese Patent Laid-Open No. 2011-215869

DISCLOSURE OF THE INVENTION

Problems to be Solved by the Invention

In a mounting work of the aforementioned pedal pad, a worker performs it by a manual work in general, and the pedal pad is mounted on the pad mounting portion while the engaged portion of the pedal pad is engaged with the engaging portion of the pad mounting portion. At this time, the worker needs to twist and fit the pedal pad while warping it in a state in which the engaged portion of the pedal pad is engaged with the engaging portion provided at one spot of the pad mounting portion, for example. On the other hand, the pedal pad needs hardness to such a degree that the pedal pad is not removed from the pad mounting portion with respect to the stepping-in operation of the driver. Thus, in order for the worker to twist and warp the pedal pad, a strong force against the elastic force is needed, and assembling performances have not been favorable.

The technology disclosed in the present application was proposed in view of the aforementioned problem. An object is to provide an operation pedal for a vehicle which can improve assembling performances of the pedal pad to the pad mounting portion.

Means for Solving the Problem

A operation pedal for a vehicle of according to a first aspect of the present application is the operation pedal for a vehicle comprising: a pad mounting portion provided on an end portion of a pedal arm mounted rotatably with respect to a vehicle and transmitting a stepping force by a stepping-on operation of a driver to the pedal arm; and a pedal pad mounted on the pad mounting portion and subjected to the stepping-on operation by the driver, wherein the pad mounting portion includes: a first flat plate having a first projecting portion provided; and a second flat plate faced with the first flat plate, having a second projecting portion not juxtaposed with the first projecting portion in any of a first direction perpendicular to the first flat plate, a second direction perpendicular to the first direction and along the first flat plate, and a third direction perpendicular to the first and second directions provided; the pedal pad includes: a first engaged portion provided in accordance with a position of the first projecting portion and engaged with the first projecting portion; and a second engaged portion provided in accordance with a position of the second projecting portion and engaged with the second projecting portion; and the pedal pad is mounted on the pad mounting portion by making the pedal pad slide in either of the second direction and the third direction.

The operation pedal for a vehicle according to a second aspect of the present application is the operation pedal for a vehicle according to claim 1, wherein the pedal pad includes: a first inner wall portion on which the first engaged portion is provided and sliding on the first flat plate when being mounted on the pad mounting portion; and a second inner wall portion on which the second engaged portion is provided and sliding on the second flat plate when being mounted on the pad mounting portion; and each of the first inner wall portion and the second inner wall portion is in close contact with the first flat plate and the second flat plate in a state, respectively, in which each of the first engaged portion and the second engaged portion is engaged with the first projecting portion and the second projecting portion respectively.

The operation pedal for a vehicle according to a third aspect of the present application is the operation pedal for a vehicle according to claim 1, wherein the pedal pad includes: an edge portion cover covering a peripheral edge portion between flat plates where the first flat plate and the second flat plate of the pad mounting portion are faced with each other.

The operation pedal for a vehicle according to a fourth aspect of the present application is the operation pedal for a vehicle according to claim 2, wherein each of the first engaged portion and the second engaged portion of the pedal pad includes a through hole penetrating the first inner wall portion and the second inner wall portion along the first direction respectively.

The operation pedal for a vehicle according to a fifth aspect of the present application is the operation pedal for a vehicle according to claims 1, wherein when the pedal pad is mounted on the pad mounting portion, a direction in which the pedal pad is made to slide is the second direction; and the first projecting portion and the second projecting portion of the pad mounting portion are formed by cutting and raising a part of each of flat plate portions of the first flat plate and the second flat plate, respectively, so as to protrude toward the first direction as it goes toward the second direction.

Effects of the Invention

According to a first aspect of the operation pedal for a vehicle of the present application, the pad mounting portion includes the first and second flat plates faced with each other, and on each of the first and second flat plates, the first and second projecting portions are provided at positions not juxtaposed with each other in any one of the first to third directions respectively. On the other hand, the pedal pad is mounted on the pad mounting portion by engagement of the first projecting portion with the first engaged portion and engagement of the second projecting portion with the second engaged portion. The worker mounts the pedal pad on the pad mounting portion by sliding it in either of the second direction and the third direction along the first flat plate. Thus, in the mounting work, there is no need for the worker to twist or rotate and to fit the pedal pad while engaging it with a part of the pad mounting portion but the pedal pad can be mounted with a smaller force. Moreover, the first and second projecting portions provided on the pad mounting portion are located at offset positions not juxtaposed with each other in any one of the first to third directions and thus, it is possible to prevent the pedal pad from coming off the pad mounting portion even if a force acts for rotating the pedal pad with respect to the pad mounting portion by a stepping force of the stepping-on operation of the driver. As a result, in this operation pedal for a vehicle, assembling performances of the pedal pad on the pad mounting portion can be improved while the pedal pad is prevent from coming off the pad mounting portion.

Moreover, according to a second aspect of the present application, the first engaged portion is provided on the first inner wall portion sliding on the first flat plate and the second engaged portion is provided on the second inner wall portion sliding on the second flat plate when the pedal pad is made to slide and is mounted on the pad mounting portion. Then, when the mounting work is completed, and in a state in which each of the first and second engaged portions is engaged with the first and second projecting portions respectively, each of the first and second inner wall portions is in close contact with the first and second flat plates respectively. In this operation pedal for a vehicle, by bringing the first and second inner wall portions on which the first and second engaged portions are provided into close contact with the first and second flat plates on which the first and second projecting portions are provided, the pedal pad can be mounted on the pad mounting portion in a state in which each of the first and second projecting portions is respectively engaged with the first and second engaged portions more reliably.

Moreover, according to a third aspect of the present application, the pedal pad includes the edge portion cover covering the peripheral edge portion between the flat plates, where the first flat plate and the second flat plate are faced with each other. The pedal pad is mounted on the pad mounting portion with each of the first and second engaged portions being engaged with the first and second projecting portions respectively in a state in which the peripheral edge portion of the first and second flat plates is covered by the edge portion cover. As a result, if, for example, a force acts for rotating the pedal pad with respect to the pad mounting portion by the stepping force of the driver, contact between the peripheral edge portion of the first and second flat plates and the edge portion cover restricts movement of the pedal pad in the direction in which the force acts. Therefore, in this operation pedal for a vehicle, the pedal pad can be prevent from coming off the pad mounting portion with more reliably.

Moreover, according to a fourth aspect of the present application, in the pedal pad, the through hole penetrating the first and second inner wall portions along the first direction is formed as the first and second engaged portions. In this composition, in the case of machining of the first and second engaged portions, for example, of manufacture of the pedal pad by injection molding of a soft resin, the through hole along one direction (first direction) can be formed as the first and second engaged portions in the same process as the injection molding of the pedal pad using a molding die. That is, by making shapes of the first and second engaged portions easy to be machined, the pedal pad including the first and second engaged portions can be manufactured easily.

Moreover, according to a fifth aspect of the present application, the pedal pad is made to slide along the second direction and is mounted on the pad mounting portion. Moreover, the first and second projecting portions are formed by cutting and raising a part of each of the flat plate portions of the first and second flat plates and are formed so as to protrude toward the first direction as it goes toward the second direction. In this composition, the first and second projecting portions are formed so as to protrude more as they go toward the second direction. That is, the first and second projecting portions have shapes functioning as preventing from coming off for preventing the pedal pad from moving in the direction of being removed from the pad mounting portion. Preferably, by engaging the first and second projecting portions formed by this cutting/raising with the first and second engaged portions composed by the through hole in the fourth aspect, the pedal pad can be prevent from coming off the pad mounting portion with more reliably.

BEST MODE FOR CARRYING OUT THE INVENTION

Figure 1:
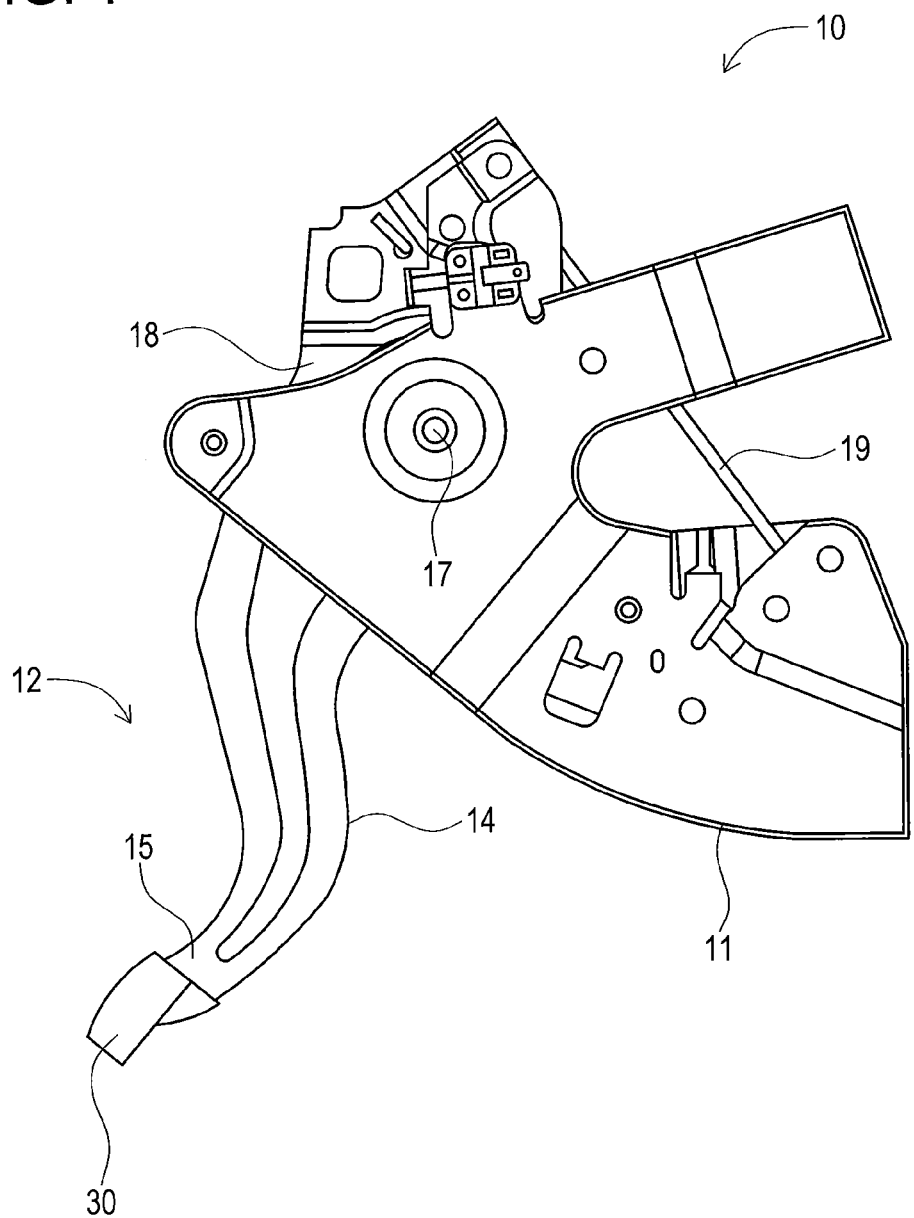
FIG. 1 is a side view of an operation pedal device for a vehicle of this embodiment.

An operation pedal device for a vehicle according to an embodiment embodying the present invention will be described below by referring to the attached drawings. FIG. 1 is a side view of an operation pedal device 10 for a vehicle of this embodiment when seen from a width direction of a vehicle. The operation pedal device for a vehicle (hereinafter referred to as a "pedal device") 10 is a foot-stepping type parking brake device, for example, and includes a bracket 11 integrally fixed to a vehicle body and an operation pedal 12 mounted rotatably to the bracket 11. FIG. 1 illustrates a state of an initial position before the operation pedal 12 is subjected to a stepping-on operation.

The operation pedal 12 includes an elongated pedal arm 14 disposed in a vertical direction (vertical direction in FIG. 1) of the vehicle and a pedal pad 30 mounted on a lower end portion 15 of the pedal arm 14 and on which a driver performs a stepping-on operation. On the bracket 11, a support shaft 17 disposed in the width direction of the vehicle (direction orthogonal to a sheet surface in FIG. 1) is mounted. The pedal arm 14 has a cylindrical collar penetrating an upper end portion 18 in the width direction of the vehicle provided, and the support shaft 17 is penetrated through the collar. As a result, the pedal arm 14 is pivotally supported rotatably with respect to the bracket 11. The pedal arm 14 is disposed in an attitude with a lower end portion 15 on which the pedal pad 30 is provided is tilted to a rear side of the vehicle (left side in FIG. 1) more than the upper end portion 18 pivotally supported by the support shaft 17. In the operation pedal 12, the pedal arm 14 rotates around the support shaft 17 when the pedal pad 30 is stepped on by the driver.

The pedal device 10 includes a lock mechanism (not shown), and the operation pedal 12 is locked on a front side of the vehicle by stepping-on of the pedal pad 30 by the driver and the operation pedal 12 is unlocked by stepping-on again. Moreover, the pedal arm 14 is connected to a brake mechanism (not shown) through a brake cable 19. In the pedal device 10, when the pedal pad 30 is stepped on by the driver, the pedal arm 14 is rotated, and the brake cable 19 is pulled with the rotation of the pedal arm 14, whereby the brake mechanism is operated. Moreover, in the operation pedal 12, the pedal arm 14 is urged by a return spring, and in a state in which the pedal pad 30 is stepped on and the brake mechanism is not operated, a stopper provided on the bracket 11 restricts the rotation of the pedal arm 14 to a state at an initial position.

(Pad Mounting Portion 22)

Figure 2:
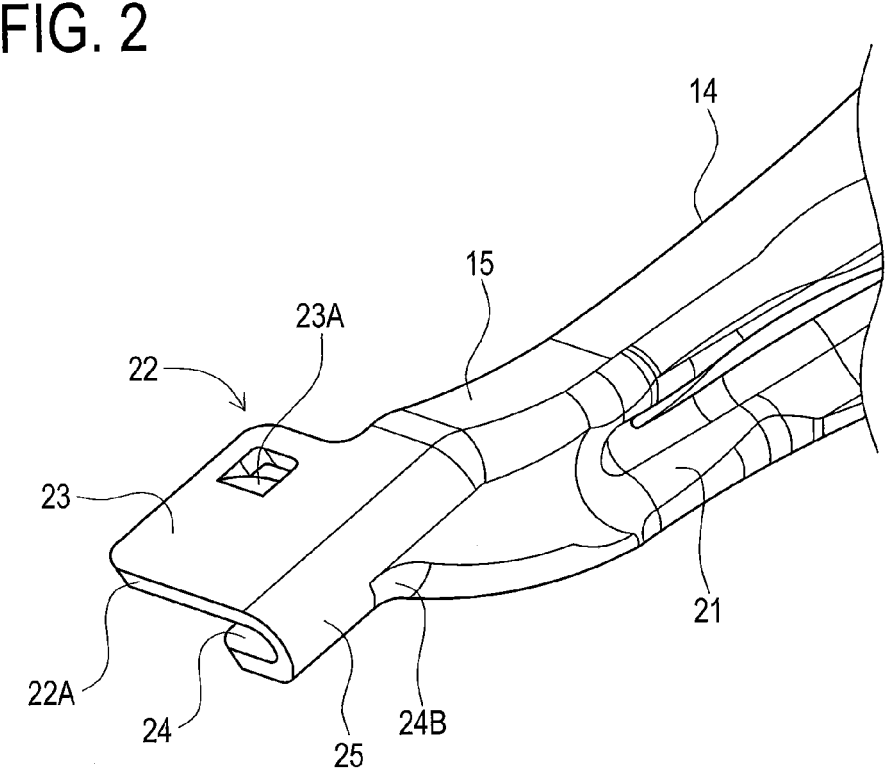
FIG. 2 illustrates a pedal arm in a state in which a pedal pad is removed and is an enlarged view of a lower end portion of the pedal arm.

FIG. 2 is an enlarged perspective view of the lower end portion 15 of the pedal arm 14 and illustrates the pedal arm 14 in a state in which the pedal pad 30 is removed. In the pedal arm 14, at a tip end portion of a body portion 21 disposed from the upper end portion 18 to the lower end portion 15, the pad mounting portion 22 extended from the body portion 21 is formed. On the pad mounting portion 22, the aforementioned pedal pad 30 is mounted. The pedal arm 14 is manufactured by pressing a flat-plate shaped steel plate, for example, and sections of the body portion 21 and the pad mounting portion 22 of the pedal arm 14 are formed having a substantially U-shape. As a result, in the pedal arm 14, rigidity against a direction in which the driver steps on (first direction in FIG. 3) is improved, while a weight of the pedal arm 14 is reduced. Moreover, in this type of composition, machining of the pedal arm 14 is facilitated, and a manufacturing cost can be reduced.

The pad mounting portion 22 includes first and second flat plates 23 and 24 formed having flat-plate shapes and a bent portion 25 connecting the first and second flat plates 23 and 24. The first flat plate 23 is located on an upper side in a vertical direction of the vehicle with respect to the second flat plate 24. The second flat plate 24 has its part faced with the first flat plate 23 so that their flat surfaces are in parallel with each other. The bent portion 25 is formed integrally with each of the first and second flat plates 23 and 24 and connects the first and second flat plates 23 and 24 to each other. The first flat plate 23 has a projecting portion 23A for mounting the pedal pad 30 formed. The projecting portion 23A is formed by cutting and raising a part of the flat-plate shaped first flat plate 23, for example.

Figure 3:
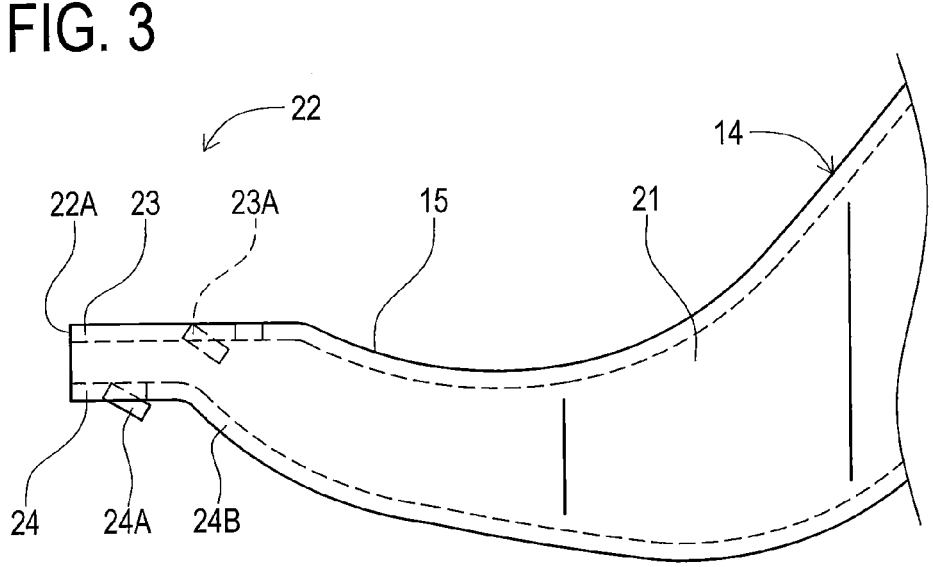
FIG. 3 is a side view of the lower end portion of the pedal arm in the state in which the pedal pad is removed when seen from a bent portion side.

FIG. 3 is a side view of the pedal arm 14. In the following description, as illustrated in FIG. 3, a direction from the first flat plate 23 toward the second flat plate 24 along a direction perpendicular to the flat surface of the first flat plate 23 is referred as the first direction, a direction from a tip end portion 22A of the pad mounting portion 22 toward the body portion 21 along the flat surface of the first flat plate 23 in a direction perpendicular to the first direction as a second direction, and a direction from the bent portion 25 side toward the first flat plate 23 side in a direction perpendicular to both the first and second directions as a third direction. Moreover, definitions of the first to third directions are changed as appropriate depending on the structure of the pad mounting portion 22 and the like.

As illustrated in FIG. 3, the projecting portion 23A is formed by being cut and raised so as to protrude to one side of the first direction (lower side of the first flat plate 23) as it goes from the tip end portion 22A of the pad mounting portion 22 toward the body portion 21 side in the second direction. Moreover, the second flat plate 24 has a projecting portion 24A for mounting the pedal pad 30 formed. The projecting portion 24A is formed by having a part of a flat plate portion of the second flat plate 24 cut and raised similarly to the projecting portion 23A. The projecting portion 24A is cut and raised so as to protrude to a lower side of the second flat plate 24 as it goes from the tip end portion 22A of the pad mounting portion 22 toward the body portion 21 side in the second direction. The second flat plate 24 has a curved portion 24B formed at a portion on the body portion 21 side rather than a position where the projecting portion 24A is formed in the second direction. The curved portion 24B is formed by being curved to the lower side of the second flat plate 24 so that a distance from the first flat plate 23 gets longer as it goes from a position faced with the projecting portion 23A of the first flat plate 23 in the first direction toward the body portion 21. Therefore, the second flat plate 24 is faced with the first flat plate 23 so that their flat surfaces are in parallel with each other on the portion on the tip end portion 22A side and is curved in a direction away from the first flat plate 23 on the portion on the body portion 21 side.

Figure 4:
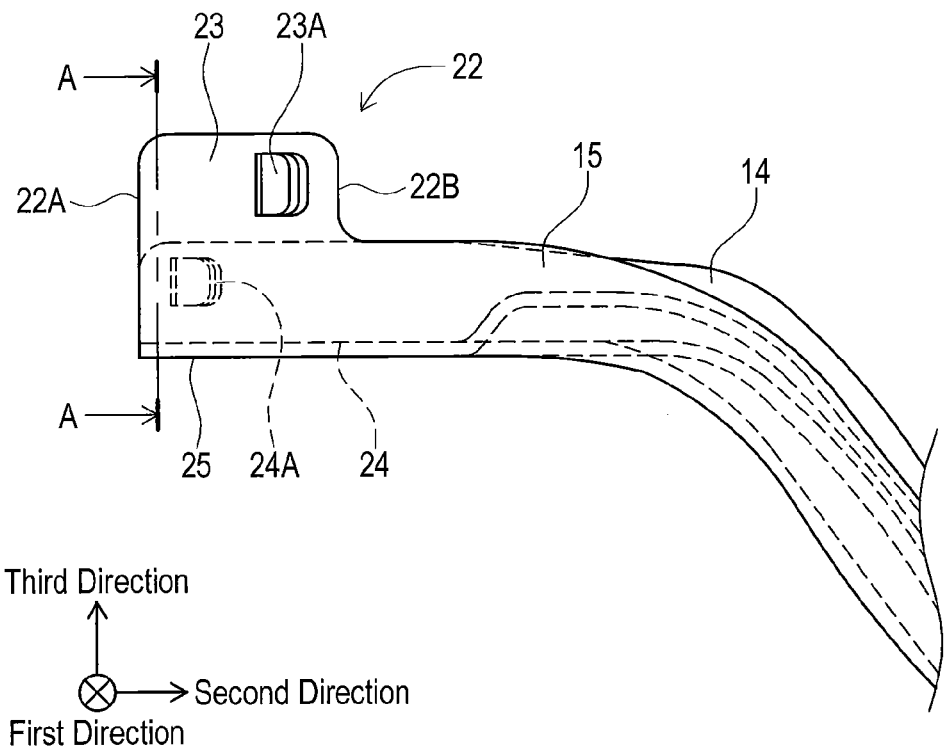
FIG. 4 is a plan view of the lower end portion of the pedal arm when seen toward a first direction.

The projecting portions 23A and 24A are provided on each of the first and second flat plates 23 and 24 faced in the first direction and thus, their positions to each other are shifted along the first direction. Moreover, the projecting portion 24A is located at a position closer to the tip end portion 22A in the second direction than the projecting portion 23A. Therefore, the projecting portions 23A and 24A are located at positions shifted from each other along the second direction. As illustrated in FIG. 4, the first flat plate 23 is formed having a substantially rectangular shape when seen from the first direction with a longitudinal direction formed along the third direction and a shorter direction along the second direction. The second flat plate 24 is formed having a substantially rectangular shape with a length in the third direction shorter than that of the first flat plate 23 and with the longitudinal direction along the second direction. In the first flat plate 23, the projecting portion 23A is formed on a portion not faced with the second flat plate 24 in the first direction. The projecting portion 24A is located at a position closer to the bent portion 25 than the projecting portion 23A in the third direction. Thus, the projecting portions 23A and 24A are located at the positions shifted from each other along the third direction. Therefore, the projecting portions 23A and 24A are provided at the offset positions where their positions are not juxtaposed in any one of the first direction, the second direction, and the third direction. The projecting portions 23A and 24A are formed in accordance with the length of each of the first and second flat plates 23 and 24 in the third direction, and in this embodiment, a width of the projecting portion 23A along the third direction is longer than the projecting portion 24A.

Figure 5:
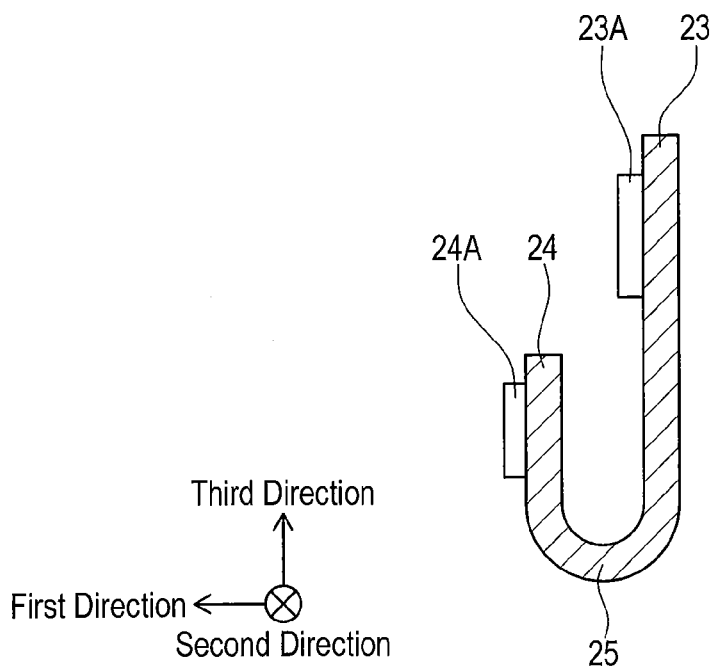
FIG. 5 is a sectional view of a pad mounting portion of the pedal arm shown in FIG. 4 cut in an A-A line and seen toward a second direction.

FIG. 5 is a sectional view of the pad mounting portion 22 shown in FIG. 4 cut in an A-A line. The projecting portion 23A has a distance protruding toward the first direction shorter than a distance from a lower surface of the first flat plate 23 to an upper surface of the second flat plate 24 and is formed with a size that the projecting portion 23A is accommodated between the first and second flat plates 23 and 24. Moreover, the bent portion 25 is curved so as to protrude outward from both end portions connected to the first and second flat plates 23 and 24, respectively.

(Pedal Pad 30)

Figure 6:
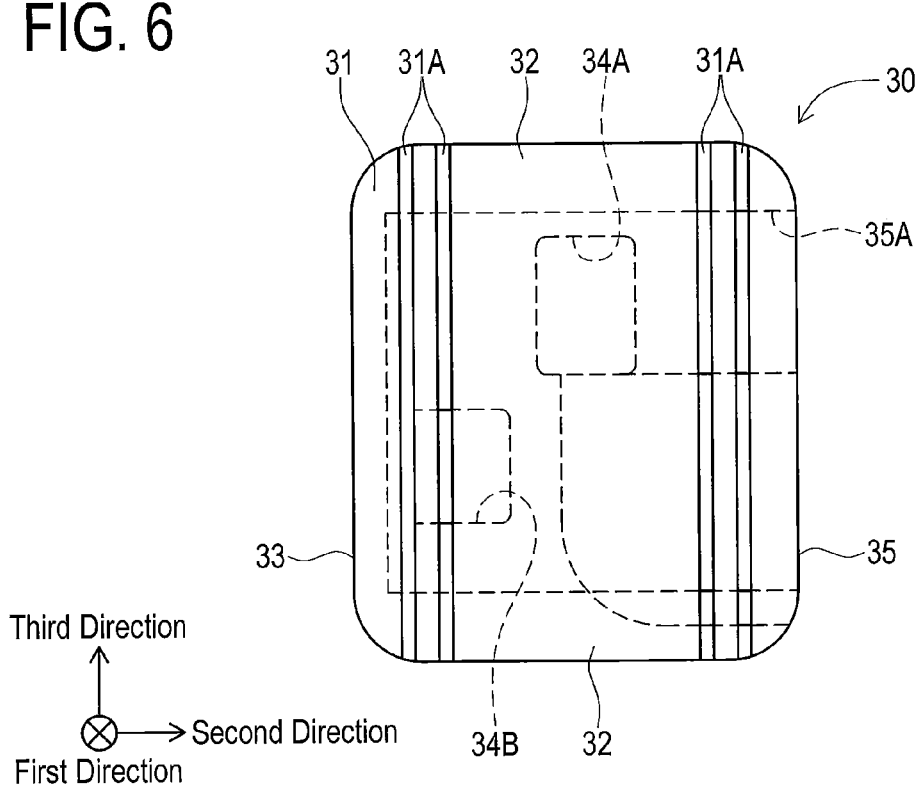
FIG. 6 is a plan view of the pedal pad when seen toward the first direction.
Figure 7:
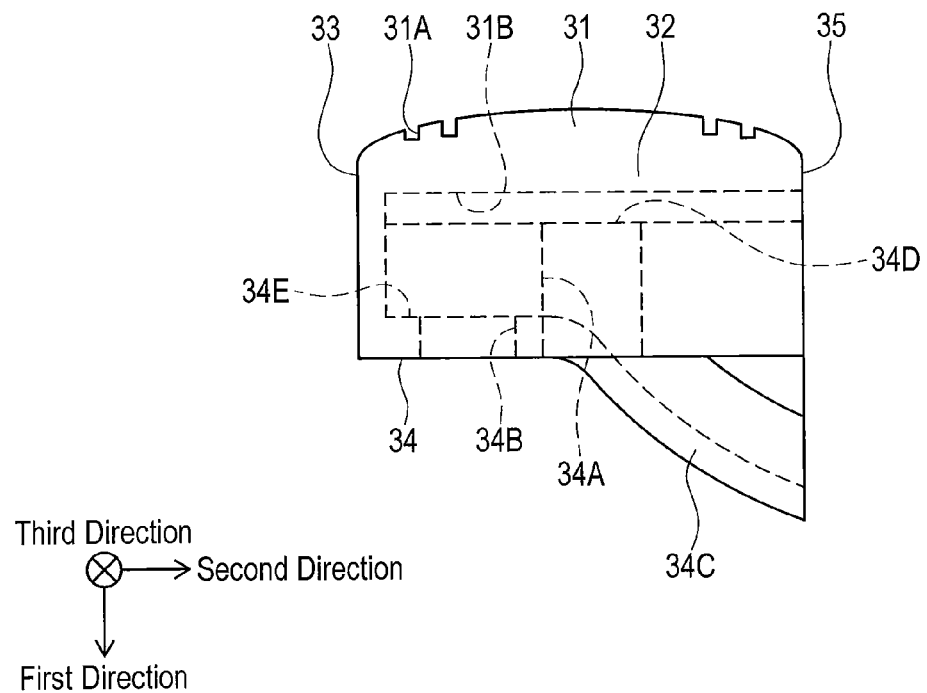
FIG. 7 is a side view of the pedal pad when seen toward a third direction.

FIGS. 6 to 9 illustrate the pedal pad 30 in a state removed from the pad mounting portion 22. In the following description, the first to third directions are described assuming a state in which the pedal pad 30 is mounted on the pad mounting portion 22. As illustrated in FIGS. 6 and 7, the pedal pad 30 is composed by an upper surface cover 31, an edge portion cover 32, a tip end portion cover 33, a lower surface cover 34 (see FIG. 7), and a rear end portion cover 35 and has a box shape covering an outer periphery of the pad mounting portion 22. The pedal pad 30 is a molded product made of an elastic material, for example (injection molding product of a soft resin, rubber vulcanized molding product and the like, for example).

The upper surface cover 31 is formed having a substantially rectangular shape when seen from the first direction and is formed so as to cover the upper surface of the first flat plate 23. The upper surface cover 31 is a portion on which a foot of the driver is placed when the stepping-on operation is made by the driver. In the upper surface cover 31, a plurality of grooves 31A for preventing slip of the foot of the driver on the upper surface cover 31 are formed along the third direction. In the upper surface cover 31, a flat surface having substantially the same shape as the upper surface of the first flat plate 23 is formed on an inner wall portion 31B. Moreover, in the pedal pad 30, through holes 34A and 34B formed respectively in accordance with a position of each of the projecting portion 23A of the first flat plate 23 and the projecting portion 24A of the second flat plate 24 formed in the lower surface cover 34 (see FIGS. 7 and 9). The through hole 34A is formed in accordance with the position of the projecting portion 23A. The through hole 34B is formed in accordance with the position of the projecting portion 24A. In the lower surface cover 34, a curved portion cover 34C is formed in accordance with the shape of the curved portion 24B of the second flat plate 24 provided. Moreover, the edge portion cover 32 is formed having a flat plate shape covering the entire peripheral edge portion (side surface portion of the pad mounting portion 22 in the third direction) between flat plates of the first and second flat plates 23 and 24.

Figure 8:
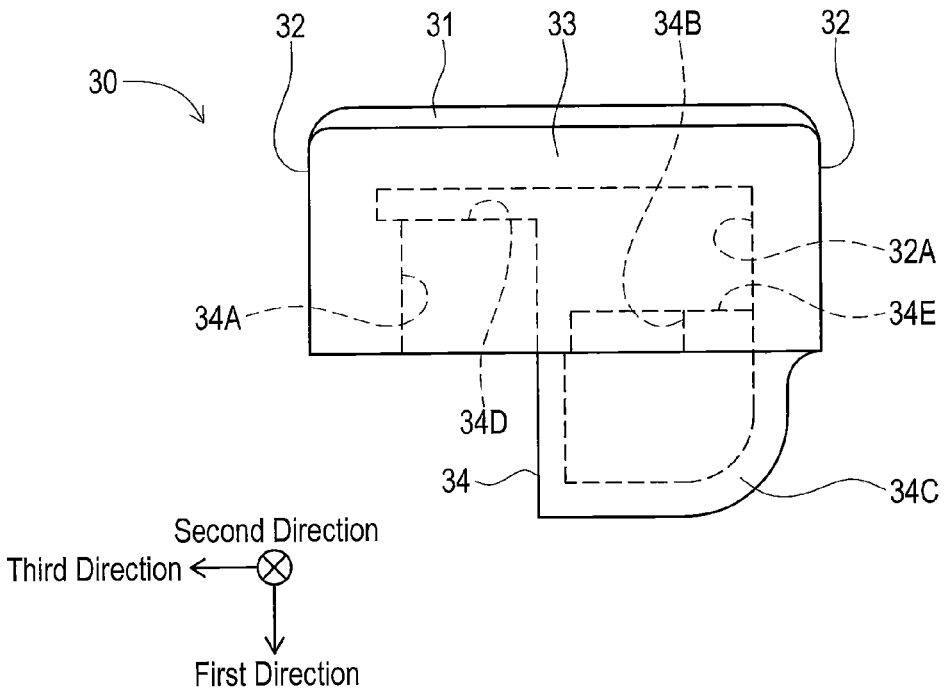
FIG. 8 is a side view of the pedal pad when seen toward a second direction.
Figure 9:
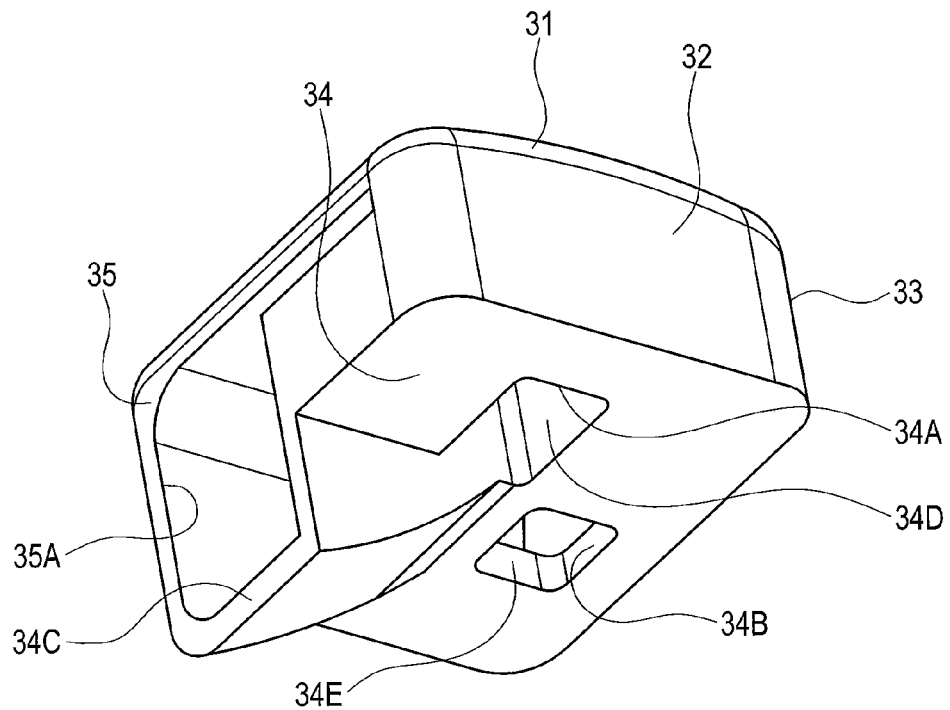
FIG. 9 is a perspective view of the pedal pad when seen from a lower side in the first direction.

As illustrated in FIG. 8, the tip end portion cover 33 is formed having a flat-plate shape covering entirely the tip end portion 22A of the pad mounting portion 22 (see FIG. 2). The edge portion cover 32 has a flat surface in contact with side surface portions on both sides of the pad mounting portion 22 in the third direction formed on the inner wall portion 32A. The lower surface cover 34 has a first inner wall portion 34D formed in accordance with a position and a shape of the lower surface of the first flat plate 23. Moreover, the lower surface cover 34 has a second inner wall portion 34E formed in accordance with a position and a shape of the lower surface of the second flat plate 24. As illustrated in FIG. 9, the first and second inner wall portions 34D and 34E of the lower surface cover 34 are formed so as to cover the lower surfaces of the first and second flat plates 23 and 24. Each of the through holes 34A and 34B is fainted by penetrating the first and second inner wall portions 34D and 34E along the first direction respectively. Moreover, the rear end portion cover 35 is formed so as to cover a rear end portion 22B (see FIG. 4) on a side opposite to the tip end portion 22A of the pad mounting portion 22 in the second direction. In the rear end portion cover 35, an opening portion 35A into which the pad mounting portion 22 is inserted is formed. The opening portion 35A is opened large on a portion where the curved portion cover 34C is formed.

Figure 10:
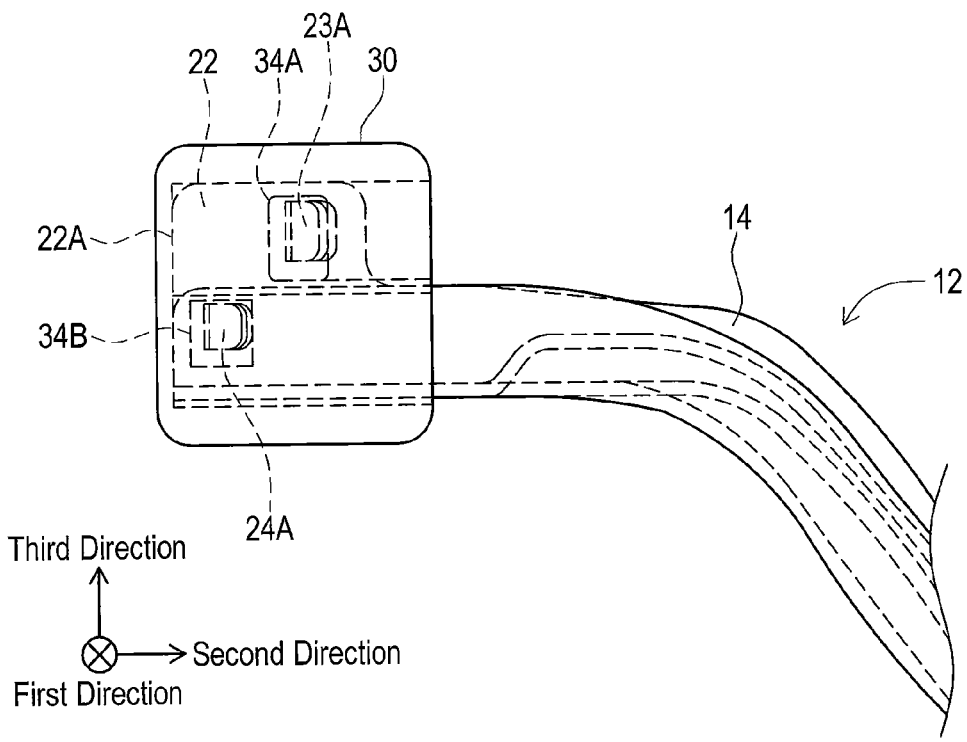
FIG. 10 is a plan view of an operation pedal in a state in which the pedal pad is mounted on the pad mounting portion and when seen toward the first direction.

The pedal pad 30 composed as above is mounted on the pad mounting portion 22 by inserting the pad mounting portion 22 into the opening portion 35A and by fitting and locking the projecting portions 23A and 24A of the first and second flat plates 23 and 24 in and by the through holes 34A and 34B. FIG. 10 illustrates a state in which the pedal pad 30 is mounted on the pad mounting portion 22.

In a mounting work, the worker faces the opening portion 35A of the pedal pad 30 with the tip end portion 22A of the pad mounting portion 22 and moves the pedal pad 30 toward the second direction so as to slide with respect to the pad mounting portion 22. The worker makes the pad mounting portion 22 slide until it is completely fitted in the pedal pad 30. At this time, in the pedal pad 30, the first inner wall portion 34D of the lower surface cover 34 slide on the first flat plate 23 and the second inner wall portion 34E slides on the second flat plate 24. Moreover, in the pedal pad 30, the portion where the through holes 34A and 34B are formed is elastically deformed to the lower side in the first direction so as to follow inclination of the projecting portions 23A and 24A. Then, when the pedal pad 30 reaches a portion where the tip end portions of the projecting portions 23A and 24A are accommodated in the through holes 34A and 34B, a portion around which the through holes 34A and 34B are formed is elastically deformed to the upper side in the first direction by an elastic force (recovering force to return to an original position). As a result, the pedal pad 30 is mounted with inner walls of the through holes 34A and 34B locked by the projecting portions 23A and 24A of the pad mounting portion 22.

Figure 11:
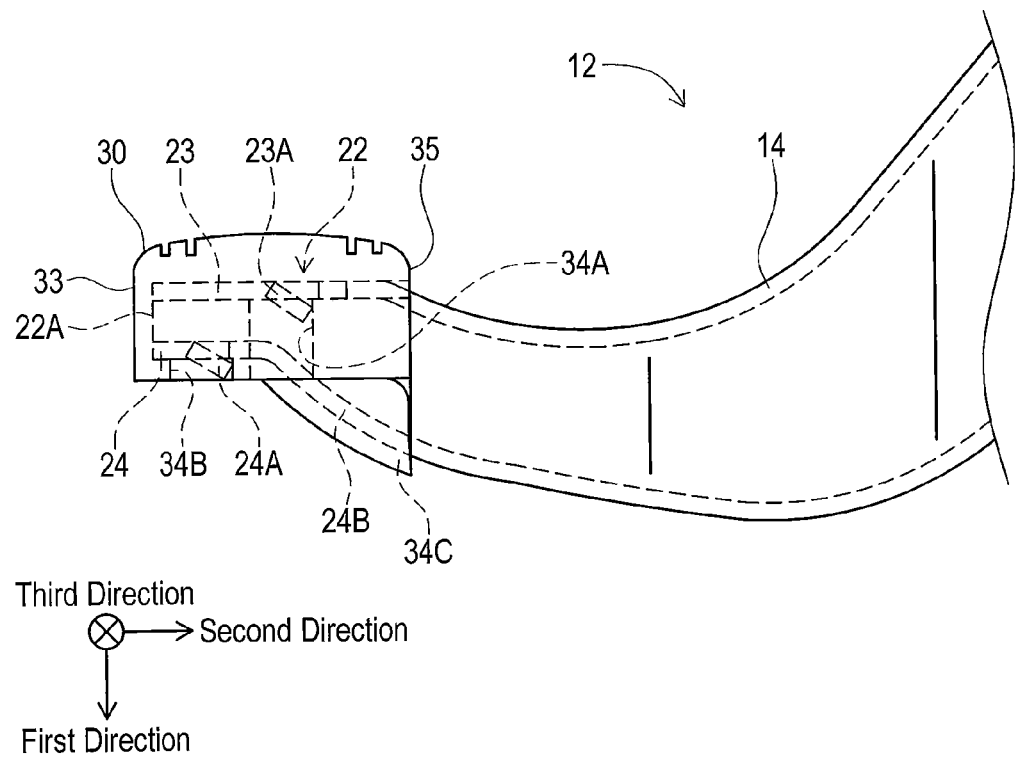
FIG. 11 is a side view of the operation pedal when seen toward the third direction.

As illustrated in FIG. 11, in the pedal pad 30, the inner walls of the through holes 34A and 34B on the rear end portion cover 35 side are locked by the tip end portions of the projecting portions 23A and 24A. The pad mounting portion 22 enters a state in which parts of the projecting portions 23A and 24A are accommodated in each of the through holes 34A and 34B. The pedal pad 30 is mounted so as to cover the entire pad mounting portion 22. The upper surface cover 31 is fixed in a state in which the inner wall portion 31B is in close contact with the upper surface of the first flat plate 23. Similarly, the lower surface cover 34 is fixed in a state in which the first inner wall portion 34D is in close contact with the lower surface of the first flat plate 23 and the second inner wall portion 34E with the lower surface of the second flat plate 24, respectively. Moreover, the edge portion cover 32 is fixed in a state in which a part of the inner wall portion 32A is in contact with the side surface portions on the both sides of the pad mounting portion 22 in the third direction.

According to the aforementioned embodiment, the following effects are exerted.

<Effect 1> The first and second flat plates 23 and 24 provided in the pad mounting portion 22 of this embodiment are provided at the offset positions not juxtaposed in any one of the first to third directions with the projecting portions 23A and 24A for locking the pedal pad 30. With respect to the pad mounting portion 22 in such composition, the pedal pad 30 is mounted on the pad mounting portion 22 with the inner wall of the through hole 34A locked by the projecting portion 23A and the inner wall of the through hole 34B locked by the projecting portion 24A. The worker inserts the tip end portion 22A of the pad mounting portion 22 into the opening portion 35A of the pedal pad 30 (see FIG. 9) and makes the pedal pad 30 slide toward one direction (the second direction in the embodiment) mounted on the pad mounting portion 22 in the mounting work. In this mounting work, the worker does not have to twist or rotate to fit the pedal pad 30 while warping it and can mount the pedal pad 30 with a smaller force. Moreover, the projecting portions 23A and 24A provided on the pad mounting portion 22 are provided at the offset positions not juxtaposed in any one of the first to third directions. It is possible to prevent the pedal pad 30 from coming off the pad mounting portion 22 even if a force acts for rotating the pedal pad 30 with respect to the pad mounting portion 22 by the stepping force of the stepping-on operation of the driver. As described above, in the operation pedal 12 of this embodiment, assembling performances of the pedal pad. 30 on the pad mounting portion 22 are improved while the pedal pad 30 is prevent from coming off the pad mounting portion 22.

<Effect 2> In the pedal pad 30, the through holes 34A and 34B are formed in the first and second inner wall portions 34D and 34E (lower surface cover 34) mounted while sliding on the lower surfaces of the first and second flat plates 23 and 24, respectively. The pedal pad 30 is mounted on the pad mounting portion 22 with the tip end portion of each of the projecting portions 23A and 24A engaged with the inner walls of the through holes 34A and 34B in the state in which the first inner wall portion 34D is in close contact with the lower surface of the first flat plate 23 and the second inner wall portion 34E with the lower surface of the second flat plate 24, respectively. In such composition, by composing inner peripheral surfaces of the first and second inner wall portions 34D and 34E by flat planes in accordance with the lower surfaces of the first and second flat plates 23 and 24 and bringing them into close contact with each other, the tip end portions of the projecting portions 23A and 24A projecting from the lower surfaces are locked so as to bite into the inner walls on the lower side in the first direction in the through holes 34A and 34B. As a result, the pedal pad 30 can be prevent from coming off the pad mounting portion 22 with more reliably.

<Effect 3> The edge portion cover 32 of the pedal pad 30 is formed having a flat-plate shape covering the entire peripheral edge portion between the flat plates of the first and second flat plates 23 and 24 (side surface portion of the pad mounting portion 22 in the third direction) and fixed in a state in which a part of the inner wall portion 32A (see FIG. 8) is in contact with the side surface portion of the pad mounting portion 22. In the pedal pad 30, a friction force is generated in accordance with a contact area between the inner wall portion 32A of the edge portion cover 32 and the side surface portion of the pad mounting portion 22. As a result, even if a force to rotate the pedal pad 30 with a straight line along the second direction as a rotating axis, for example, acts on the pad mounting portion 22, the pedal pad 30 does not rotate easily due to the friction force generated between the pad mounting portion 22 and itself and does not come off the pad mounting portion 22 easily.

<Effect 4> In the pedal pad 30, the through holes 34A and 34B penetrating each of the first and second inner wall portions 34D and 34E along the first direction respectively function as engaged portions to be engaged with the projecting portions 23A and 24A. In such composition, the through holes 34A and 34B along the first direction can be formed in the same process as injection molding of the pedal pad 30 using a molding die, for example. That is, by making the engaged portion easy to be machined, the pedal pad 30 provided with the engaged portion can be manufactured easily.

<Effect 5> The projecting portions 23A and 24A are formed by cutting and raising a part of a flat plate portion of each of the first and second flat plates 23 and 24. Moreover, the projecting portions 23A and 24A are formed so as to protrude toward the first direction as they go from the tip end portion 22A of the pad mounting portion 22 toward the body portion 21 side in the second direction in which the pedal pad 30 is made to slide when being mounted. In such composition, by continuously making the pedal pad 30 slide in the second direction, when the tip end portions of the projecting portions 23A and 24A reach the portion where they are accommodated in the through holes 34A and 34B, the portion around which the through holes 34A and 34B are formed is elastically deformed to the upper side in the first direction by the recovering force, whereby the projecting portions 23A and 24A protrude with respect to the through holes 34A and 34B of the pedal pad 30. Moreover, a part of the through holes 34A and 34B of the pedal pad 30 which has been mounted is located on the rear end portion cover 35 side in the second direction with respect to the projecting portions 23A and 24A formed by cutting and raising (see FIG. 11). That is, the projecting portions 23A and 24A have shapes functioning as prevention from coming off for preventing movement in the direction in which the pedal pad 30 comes off the pad mounting portion 22 (direction opposite to the second direction). As a result, the pedal pad 30 is prevent from coming off the pad mounting portion 22 with more reliably.

<Effect 6> The upper surface cover 31 of the pedal pad 30 is mounted on the pad mounting portion 22 in the state in which the inner wall portion 31B (see FIG. 7) is in close contact with the upper surfaces of the first and second flat plates 23 and 24. As a result, the pedal pad 30 is mounted in close contact with the flat surface (upper surface of the first flat plate 23) on which the driver steps on the pad mounting portion 22 and thus, the stepping force given to the pedal pad 30 is efficiently transmitted to the pad mounting portion 22. Moreover, even if a force to move the pedal pad 30 so as to be relatively dislocated with respect to the pad mounting portion 22 by stepping-on by the driver (movement in the second direction and the third direction, for example) acts, the dislocating movement is restricted by the friction force generated in accordance with the contact area between the inner wall portion 31B and the first flat plate 23 in close contact, and coming off is prevented.

<Effect 7> In the lower surface cover 34, the curved portion cover 34C formed in accordance with the shape of the curved portion 24B of the second flat plate 24 is provided. The pedal pad 30 is fixed to the pad mounting portion 22 in the state in which the inner peripheral surface of the curved portion cover 34C is in close contact with an outer peripheral surface of the curved portion 24B (FIG. 11) and coming off is prevented.

The operation pedal 12 in this embodiment is an example of the operation pedal for a vehicle. The projecting portion 23A is an example of the first projecting portion. The projecting portion 24A is an example of the second projecting portion. The direction in which the driver steps on the operation pedal 12 is an example of the first direction, the direction perpendicular to the first direction from the tip end portion 22A of the pad mounting portion 22 toward the body portion 21 along the flat surface of the first flat plate 23 is an example of the second direction, and the direction perpendicular to both the first and second directions and from the bent portion 25 side toward the first flat plate 23 side is an example of the third direction. The through hole 34A is an example of the first engaged portion. The through hole 34B is an example of the second engaged portion. The edge portion cover 32 is an example of the edge portion cover.

It is needless to say that the present invention is not limited to the aforementioned embodiment but is capable of various improvement and changes within a range not departing from the gist of the present invention.

For example, in the aforementioned embodiment, the operation pedal 12 (operation pedal for a vehicle) of the parking brake device was described as an example in the embodiment of the present invention but the present invention is not limited to that but is favorably applied to other operation pedals of vehicles, that is, a normal-use brake pedal, accelerator pedal, clutch pedal and the like.

Figure 12:
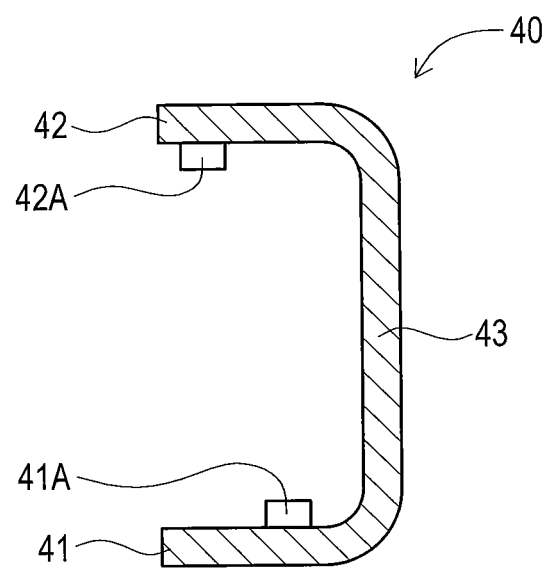
FIG. 12 is a sectional view of the pad mounting portion of another embodiment when seen toward the second direction.
Figure 12:
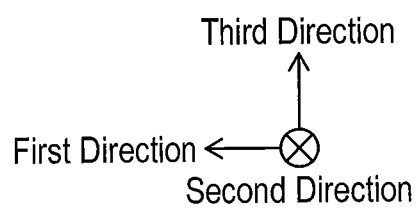

The shape, composition and the like of each member of the aforementioned embodiment are only examples and can be changed as appropriate. For example, the aforementioned embodiment is so composed that the first and second flat plates 23 and 24 are faced with each other in the first direction, but it may be changed to composition which they are faced with each other in another direction, for example, in the third direction. FIG. 12 is a sectional view of a pad mounting portion 40 in another embodiment. As illustrated in FIG. 12, the pad mounting portion 40 includes first and second flat plates 41 and 42 with their flat surfaced faced with each other in the third direction. On each of the first and second flat plates 41 and 42, projecting portions 41A and 42A formed so as to protrude to a facing flat plate side are formed respectively. The projecting portions 41A and 42A are provided at positions offset from each other in any one of the first direction, the second direction, and the third direction. The first and second flat plates 41 and 42 are connected to each other by a bent portion 43 formed along the third direction. In this case, in the pedal pad 30, the through holes 34A and 34B are formed along the third direction, for example, in accordance with the positions of the projecting portions 41A and 42A. Moreover, in the pad mounting portion 40, the bent portion 43 becomes a surface on which the driver steps and is subjected to the stepping-on operation by the driver toward the first direction (direction from the right to the left in FIG. 12). In such composition, too, similarly to the aforementioned embodiment, assembling performances of the pedal pad 30 to the pad mounting portion 22 can be improved while preventing the pedal pad 30 from coming off.

Moreover, in the composition illustrated in FIG. 12, the projecting portions 41A and 42A are formed by being cut and raised in the direction getting closer to each other. Similarly to this, in the aforementioned embodiment, in the second flat plate 24, the projecting portion 24A may be formed by being cut and raised toward the first flat plate 23 side, for example. On the contrary, in either one of the first and second flat plates 41 and 42 illustrated in FIG. 12, the projecting portions 41A and 42A may be formed outward.

Moreover, in the aforementioned embodiment, the projecting portion 23A may be changed to a position closer to the tip end portion 22A in the second direction than the projecting portion 24A. Similarly, the projecting portion 23A may be changed to a position closer to the bent portion 25 in the third direction than the projecting portion 24A.

Moreover, the shape, the number, the machining method and the like of the projecting portions 23A and 24A are examples and are changed as appropriate. For example, the projecting portion 23A may be fixed to the first flat plate 23 by welding (such as arc welding, for example).

Moreover, the shapes of the through holes 34A and 34B as the engaged portions are not limited to holes penetrating the first inner wall portion 34D but may have other shapes such as a shape formed by recessing the first inner wall portion 34D, a slit and the like.

Moreover, the pedal arm 14 may be composed by providing the pad mounting portion 22 and the body portion 21 on separate bodies and connecting (welding or the like) them to each other. Moreover, the pedal arm 14 is composed to be manufactured by pressing a single steel plate, but it may be a hollow pedal arm formed by combining a plurality of structures (a pair of split bodies or the like) with each other, and by welding them.

Moreover, the definition of each direction in the aforementioned embodiment is an example and can be changed as appropriate. For example, the aforementioned embodiment is composed such that the flat surfaces of the first and second flat plates 23 and 24 are faced with each other to be in parallel, but either one of them may be inclined to the other in composition. In this case, the definition of the first direction may be such that a direction connecting centers of the flat surfaces of the first and second flat plates 23 and 24 is defined as the first direction, for example.

Moreover, the pedal arm 14 is disposed in the vertical direction of the vehicle but this does not necessarily have to be in a fully perpendicular state but may be inclined to a front-back direction of the vehicle, for example.

DESCRIPTION OF REFERENCE NUMERALS AND SIGNS

Explanation of References 12 operation pedal
14 pedal arm
22 pad mounting portion
30 pedal pad

23 first flat plate
23A projecting portion
24 second flat plate
24A projecting portion
34A through hole
34B through hole
32 edge portion cover
34D first inner wall portion
34E second inner wall portion

What is claimed is:

1. An operation pedal for a vehicle comprising:
    a pad mounting portion provided on an end portion of a pedal arm mounted rotatably with respect to a vehicle and arranged to transmit a stepping force by a stepping-on operation of a driver to the pedal arm, the pad mounting portion being directly connected to the pedal arm; and
    a pedal pad mounted on the pad mounting portion, covering an outer periphery of the pad mounting portion and arranged to be subjected to the stepping-on operation by the driver, wherein
    the pad mounting portion includes:
        a first flat plate having a first projecting portion provided; and
        a second flat plate faced with the first flat plate, having a second projecting portion not juxtaposed with the first projecting portion in any of a first direction perpendicular to the first flat plate, a second direction perpendicular to the first direction and along the first flat plate, and a third direction perpendicular to the first and second directions;
    the pedal pad includes:
        a first engaged portion provided in accordance with a position of the first projecting portion and engaged with the first projecting portion; and
        a second engaged portion provided in accordance with a position of the second projecting portion and engaged with the second projecting portion; and
    the pedal pad is configured to be mountable on the pad mounting portion by making the pedal pad slide in either of the second direction and the third direction.

2. The operation pedal for a vehicle according to claim 1, wherein
    the pedal pad includes:
        a first inner wall portion on which the first engaged portion is provided and configured to slide on the first flat plate when being mounted on the pad mounting portion; and
        a second inner wall portion on which the second engaged portion is provided and configured to slide on the second flat plate when being mounted on the pad mounting portion; and
    each of the first inner wall portion and the second inner wall portion is in contact with the first flat plate and the second flat plate in a state, respectively, in which each of the first engaged portion and the second engaged portion is engaged with the first projecting portion and the second projecting portion respectively.

3. The operation pedal for a vehicle according to claim 1, wherein the pedal pad includes:
    an edge portion cover covering a peripheral edge portion between flat plates where the first flat plate and the second flat plate of the pad mounting portion are faced with each other.

4. The operation pedal for a vehicle according to claim 2, wherein
    each of the first engaged portion and the second engaged portion of the pedal pad includes a through hole penetrating the first inner wall portion and the second inner wall portion along the first direction respectively.

5. The operation pedal for a vehicle according to claim 1, wherein
    when the pedal pad is mounted on the pad mounting portion, a direction in which the pedal pad is made to slide is the second direction; and
    the first projecting portion and the second projecting portion of the pad mounting portion are formed by cutting and raising a part of each of flat plate portions of the first flat plate and the second flat plate, respectively, so as to protrude toward the first direction as it goes toward the second direction.

* * * * *